(12) United States Patent
Van Slyke (10) Patent No.: US 8,767,906 B2
(45) Date of Patent: Jul. 1, 2014

(54) IN-BUNDLE FORCE MEASUREMENT DEVICE AND/OR METHOD OF MEASURING FORCE APPLIED BY SPACERS IN AN ASSEMBLED FUEL BUNDLE

(75) Inventor: Roger Howard Van Slyke, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 1019 days.

(21) Appl. No.: 12/967,620

(22) Filed: Dec. 14, 2010

(65) Prior Publication Data

US 2012/0148009 A1     Jun. 14, 2012

(51) Int. Cl.
*G21C 1/01*      (2006.01)
(52) U.S. Cl.
USPC .......................................... 376/463; 376/245
(58) Field of Classification Search
USPC .................................. 376/245, 463
See application file for complete search history.

(56) References Cited

U.S. PATENT DOCUMENTS

| 5,215,705 A | 6/1993 | Butzin et al. |
| 5,490,418 A * | 2/1996 | Rebours et al. ................. 73/161 |
| 6,101,231 A * | 8/2000 | Gaylord et al. ............... 376/245 |
| 2007/0293792 A1 * | 12/2007 | Sliwa et al. .................. 600/587 |

FOREIGN PATENT DOCUMENTS

FR    2913140 A1 *  8/2008
JP    2005283321 A  * 10/2005

* cited by examiner

*Primary Examiner* — Timothy A Brainard
(74) *Attorney, Agent, or Firm* — Harness, Dickey & Pierce, PLC.

(57) ABSTRACT

In one embodiment, the in-bundle force measurement device includes an elongated main body, and a sensing structure disposed at a distal end of the main body. The sensing structure is configured to output a measurement indicative of force applied to the sensing structure.

12 Claims, 7 Drawing Sheets

IN-BUNDLE FORCE MEASUREMENT DEVICE AND/OR METHOD OF MEASURING FORCE APPLIED BY SPACERS IN AN ASSEMBLED FUEL BUNDLE

BACKGROUND

1. Field

Example embodiments generally relate to fuel structures used in nuclear power plants.

2. Description of Related Art

Generally, nuclear power plants include a reactor core having fuel arranged therein to produce power by nuclear fission. A common design in U.S. nuclear power plants is to arrange fuel in a plurality of cladded fuel rods bound together as a fuel assembly, or fuel bundle, placed within the reactor core. These fuel bundles typically include several spacing elements placed axially throughout the bundle to dampen vibration of the fuel rods, ensure minimum separation and relative positioning of the fuel rods, and mix coolant flowing axially through the bundle and spacers therein.

Figure 1:
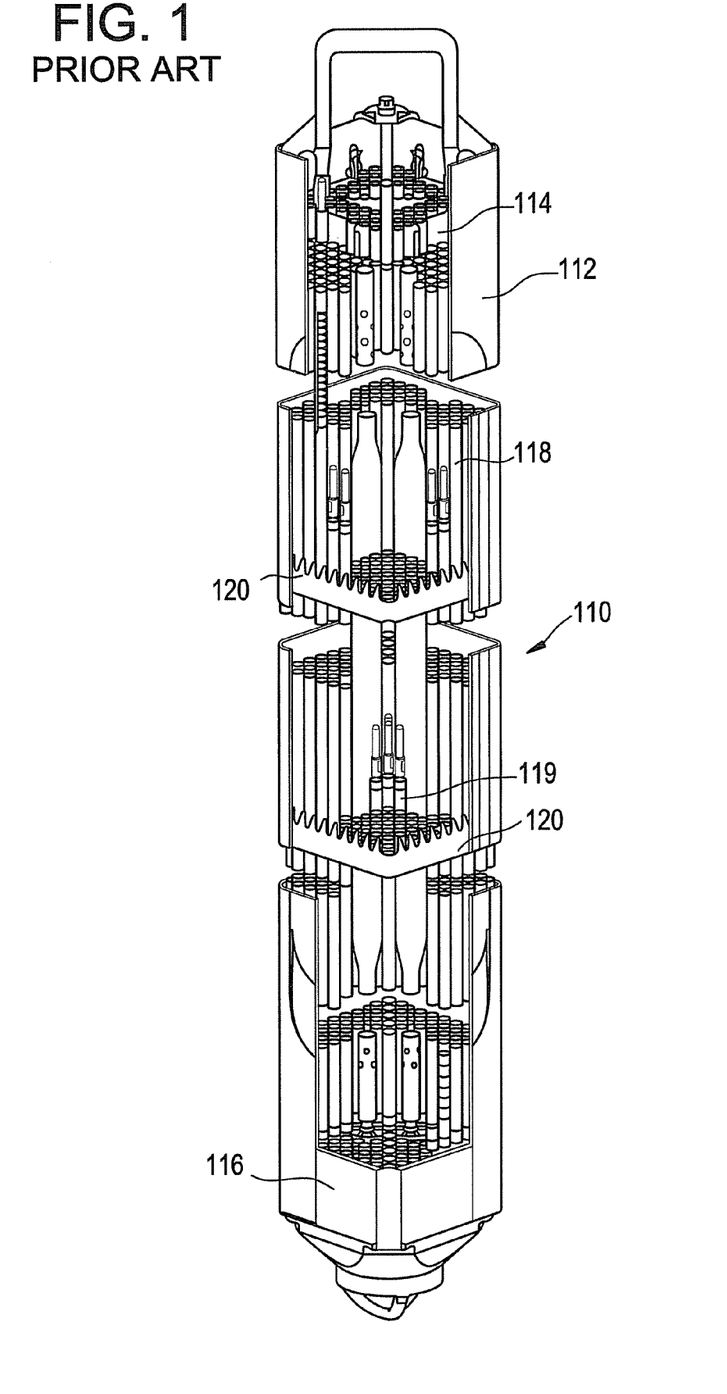
FIG. 1 is an illustration of a prior art fuel assembly having grid-type spacers affixed to the assembly.

As shown in FIG. 1, a conventional fuel bundle 110 of a nuclear reactor, such as a BWR, may include an outer channel 112 surrounding an upper tie plate 114 and a lower tie plate 116. A plurality of full length fuel rods 118 and/or part length fuel rods 119 may be arranged in a matrix within the fuel bundle 110 and pass through a plurality of spacers 120 axially spaced one from the other and maintaining the rods 118, 119 in the given matrix thereof. The fuel rods 118 and 119 are generally continuous from their base to terminal, which, in the case of the full length fuel rod 118, is from the lower tie plate 116 to the upper tie plate 114.

Figure 2:
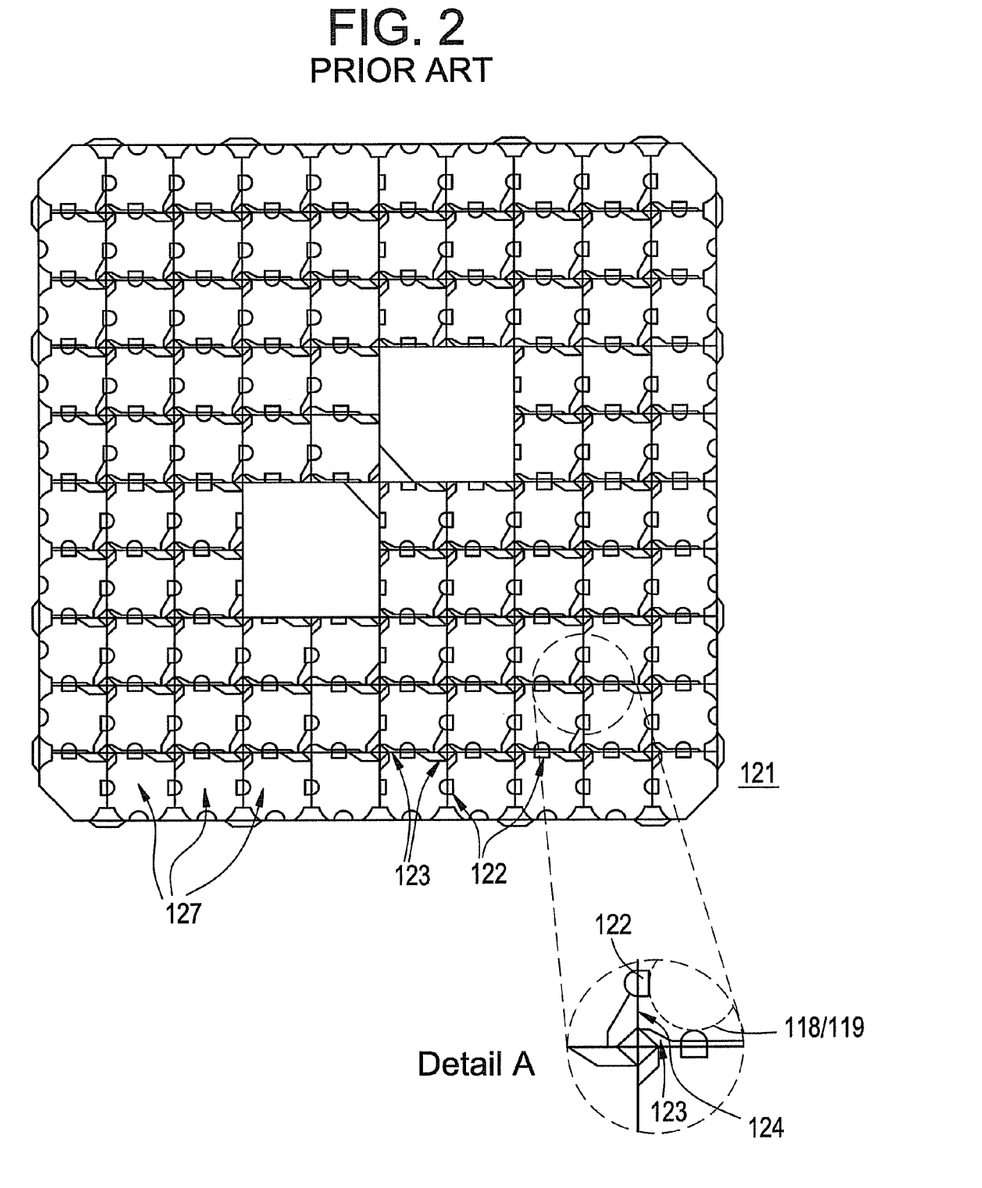
FIG. 2 is an illustration of a grid-type fuel spacer useable in example fuel assemblies.

FIG. 2 is an illustration of a grid-type spacer 121. As used herein, a specific "-type" spacer generally refers to all spacers having substantially similar hydraulic and operational characteristics, regardless of other minor variations in shape, size, rod matrix number, etc. As shown in FIG. 2, grid-type spacers 121 are a welded metal lattice divided into several boxes or cells 127 through which fuel rods 118/119 may pass. Grid-type spacers may frictionally grip to the fuel rods through the use of resistive contact segments 122, known as stops and/or springs, abutting the exterior of each rod that passes through the spacer 120. Mixing tabs and/or swirl vanes 123 may extend from the spacer 121, in order to better mix a coolant/moderator flowing through the spacer 121 and fuel rods extending there through. Example embodiment grid-type spacer 121 may be modified in several ways and still be considered a grid-type spacer. For example, gaps for water rods in the spacer may be resized, reshaped, or omitted. Or for example, the number and position of boxes 127 may be varied depending on the fuel assembly dimensions and characteristics. These variations may have a negligible effect on the overall hydraulic properties of example embodiment grid-type spacers, permitting them to remain classified as grid-type spacers.

Figure 3:
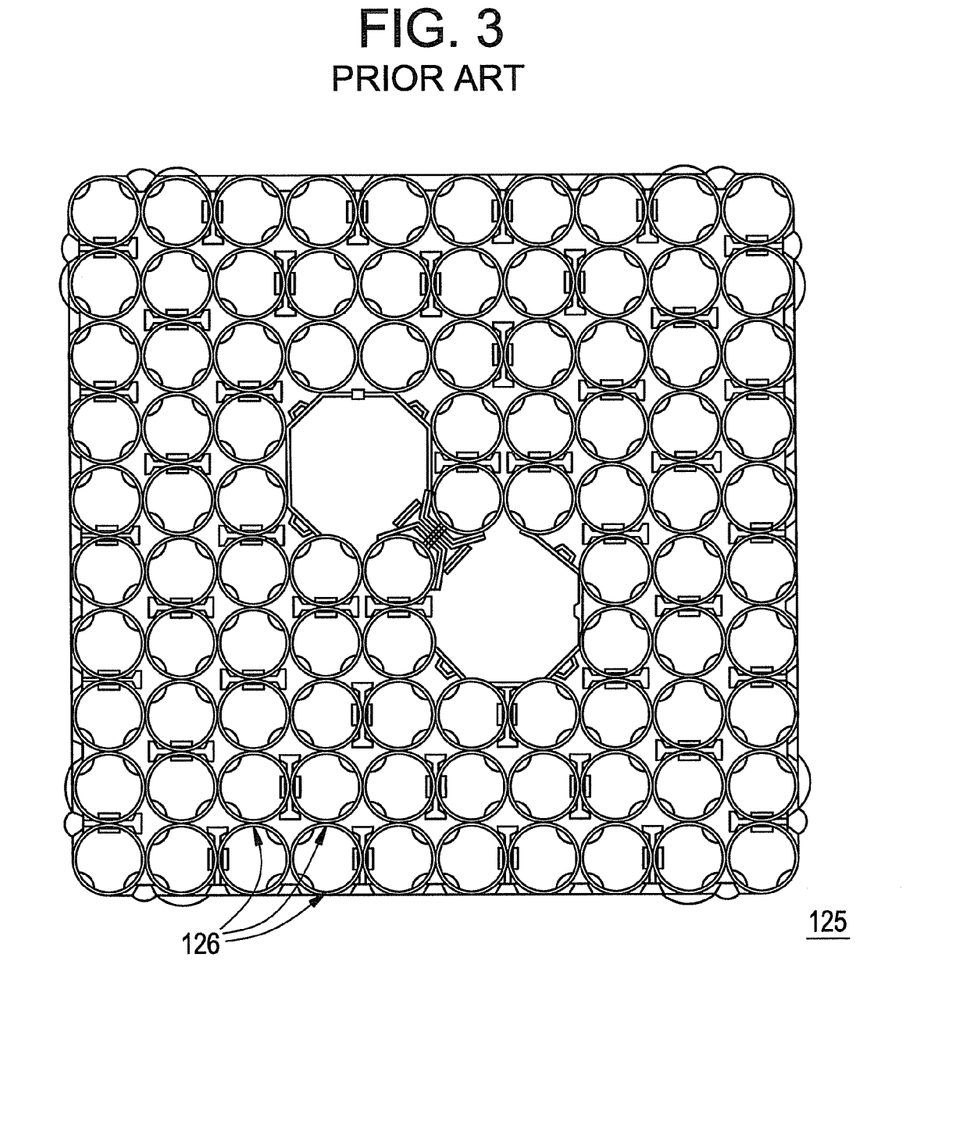
FIG. 3 is an illustration of a ferrule-type fuel spacer useable in example fuel assemblies.

FIG. 3 is an illustration of a ferrule-type spacer 125, including several ferrules 126 arranged in a grid. Each ferrule 126 may elastically fit around the circumference of a fuel rod 118/119, allowing less contact between a fuel rod 118/119 and spacer 125 and/or providing a less-restrictive flow path for a liquid film flowing through gaps between fuel rod 118/119 and spacer 125. Example embodiment spacers 121 and 125 may be held stationary at constant axial positions within the fuel bundle as high velocity coolant flows axially through the bundle 110 and may maintain fuel rods 118/119 in a static orientation within a fuel bundle. Example embodiment ferrule-type spacer 125 may be modified in several ways and still be considered a ferrule-type spacer. For example, gaps for water rods in the spacer may be resized, reshaped, or omitted. Or for example, the number and position of ferrules 26 may be varied depending on the fuel assembly dimensions and characteristics. These variations may have a negligible effect on the overall hydraulic properties of example embodiment ferrule-type spacers, permitting them to remain classified as ferrule-type spacers.

Existing method of measuring the force applied by spacers to the fuel rods requires disassembling the fuel bundle. This process cannot account for affects that rods may experience when the bundle is assembled and not experienced when disassembled. Disassembly may also bias spring force measurements. Additionally, disassembly processes are time consuming, and therefore costly. Also, this serves as an impediment to channeled fuel shipping.

SUMMARY

The present invention is directed to an in-bundle force measurement device and/or method of measuring force applied by spacers in an assembled fuel bundle.

In one embodiment, the in-bundle force measurement device includes an elongated main body, and a sensing structure disposed at a distal end of the main body. The sensing structure is configured to output a measurement indicative of force applied to the sensing structure.

In one embodiment, the sensing structure includes first and second sensors disposed on the main body facing away from one another. For example, the main body may include a handle and a shaft extending from the handle. In this example, the first and second sensors may be mounted on a distal end of the shaft. In a further embodiment, the first and second sensors each include a recessed portion shaped to engage a fuel rod.

In another embodiment, the sensing structure includes a single sensor disposed, for example, on the distal end of the shaft.

One embodiment further includes a processing device configured to convert output from the sensing structure to a force measurement. Another embodiment further includes a display configured to display the force measurement. For example, the processing device and display may be disposed in the handle or may be a separate unit.

In one embodiment, the method of measuring force applied by spacers of an assembled fuel bundle includes inserting a measurement device into a fuel bundle loaded with fuel rods. Here, the measurement device includes a sensing structure. The method further includes positioning the sensing structure of the measurement device between two fuel rods, and measuring a force based on output from the sensing structure.

In an example embodiment, the positioning step positions the sensing structure within a desired measurement distance from a spacer of the fuel bundle.

In another embodiment of the method, the sensing structure includes first and second sensors disposed on a main body and facing away from one another. Here, the positioning step may position the first and second sensors such that respective recessed portions of the first and second sensors each engage one of the two fuel rods.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 4:
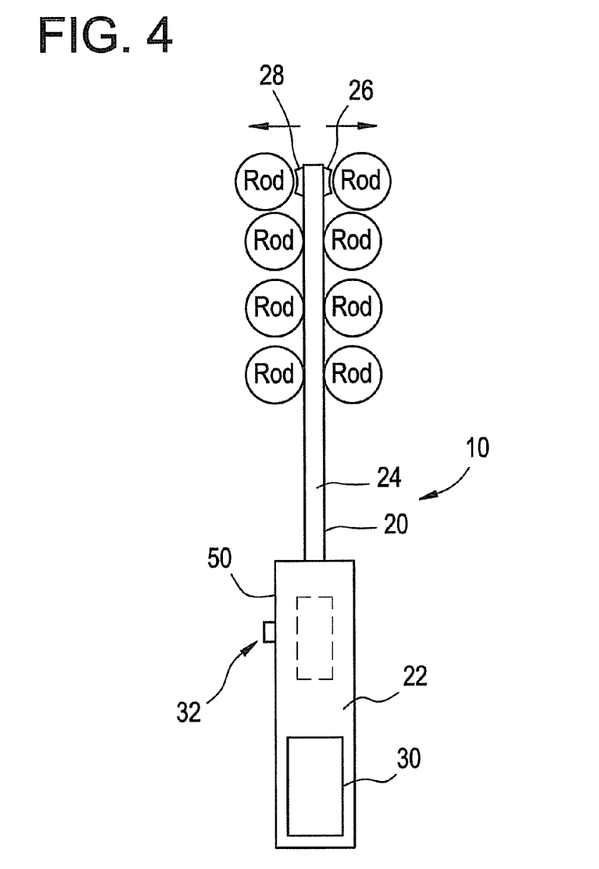
FIG. 4 illustrates an example embodiment of an in-bundle force measurement device according to the present invention.

FIG. 4 illustrates an example embodiment of an in-bundle force measurement device according to the present invention. As shown, the measurement device 10 has an elongated main body 20. The main body 20 includes a handle portion 22 and shaft portion 24 extending from the handle portion 22. The handle portion 22 may be a cylinder in shape, and may be sized to have a diameter that comfortably fits in a person's hand. The shaft portion 24 is sized such that the shaft fits between fuel rods, such as fuel rods 18/19 in FIG. 1, in an assembled bundle (this is shown in FIG. 4). The shaft portion 24 may be cylinder shaped, rectangular shaped, etc.

First and second sensors 26 and 28 are disposed on the shaft portion 24 such that the first and second sensors 26 and 28 face in opposite directions from one another. The first and second sensors 26 and 28 may be pressure sensors. For example, the first and second sensors 26 and 28 may be piezoelectric pressure sensors that include a piezoelectric crystal that outputs an electric signal in proportion to pressure applied thereto. When positioned between two fuel rods, the first and second sensors 26 and 28 provide pressure readings that indicate an amount of force to separate the fuel rods. Namely, the first and second sensors 26 and 28 form a sensing structure configured to output a measurement indicative of force applied to the sensing structure. This force may directly relate to the force (e.g., spring force) being applied by a spacer to maintain the fuel rods in their desired position. Accordingly, it will be appreciated that the shaft portion 24 has sufficient length to position the first and second sensors 26 and 28 between the inner most fuel rods of a fuel bundle.

The handle portion 22 may include a processing device 50 that processes the output from the first and second sensor 26 and 28, and displays a force measurement on a display screen 30 embedded in the handle portion 22. While not shown, the shaft portion 24 may include wires connecting output of the first and second sensors 26 and 28 to the processing device 50. A push button 32 may be disposed in conjunction with the handle to activate/deactivate the processing device 50 and the display screen 30.

Figure 5:
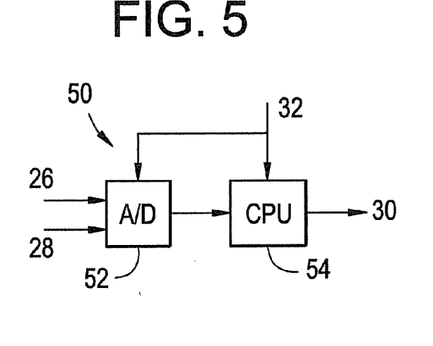
FIG. 5 illustrates an example of the processing device.

FIG. 5 illustrates an example of the processing device. As shown, the processing device 50 may include an analog-to-digital (A/D) converter 52 that converts the analog output from the first and second pressure sensors 26 and 28 to digital. A computer processing unit (CPU) 54 may receive the digital output of the A/D converter 52 and convert the digital output to a force measurement. The CPU 54 may display the force measurement on the display 30. The display 30 may be a LED display, a LCD display, etc. The push button 32 may control enabling/disabling the processing device 50 and the display 30. For example, the push button 32 may control whether power, for example battery power, not shown, is supplied to the processing device 50 and the display 30. In one embodiment, the handle portion 22 may be configured to hold one or more batteries (not shown) for supplying power to the processing device 50 and the display 30. Alternatively, a solar cell may be incorporated into the handle portion 22 for supplying power to the processing device 50 and the display 30.

Figure 6:
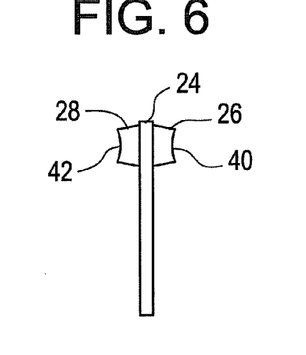
FIG. 6 illustrates the first and second sensors of the measurement device in FIG. 4 in greater detail.

As shown in FIG. 6, to ensure proper positioning of the first and second sensors 26 and 28 between adjacent fuel rods, the first and second sensors 26 and 28 may include first and second recessed portions 40 and 42, respectively. For example, the first and second recessed portions 40 and 42 may be concave and have a curvature that mirrors the circumference of the fuel rods. It will be appreciated that the recessed portions 40 and 42 are not limited to this shape, and may be grooves, notches, slots, depressions, etc. and have any surface that engages with a fuel rod such as a curved surface, rectangular surface, triangular surface, etc.

Figure 7:
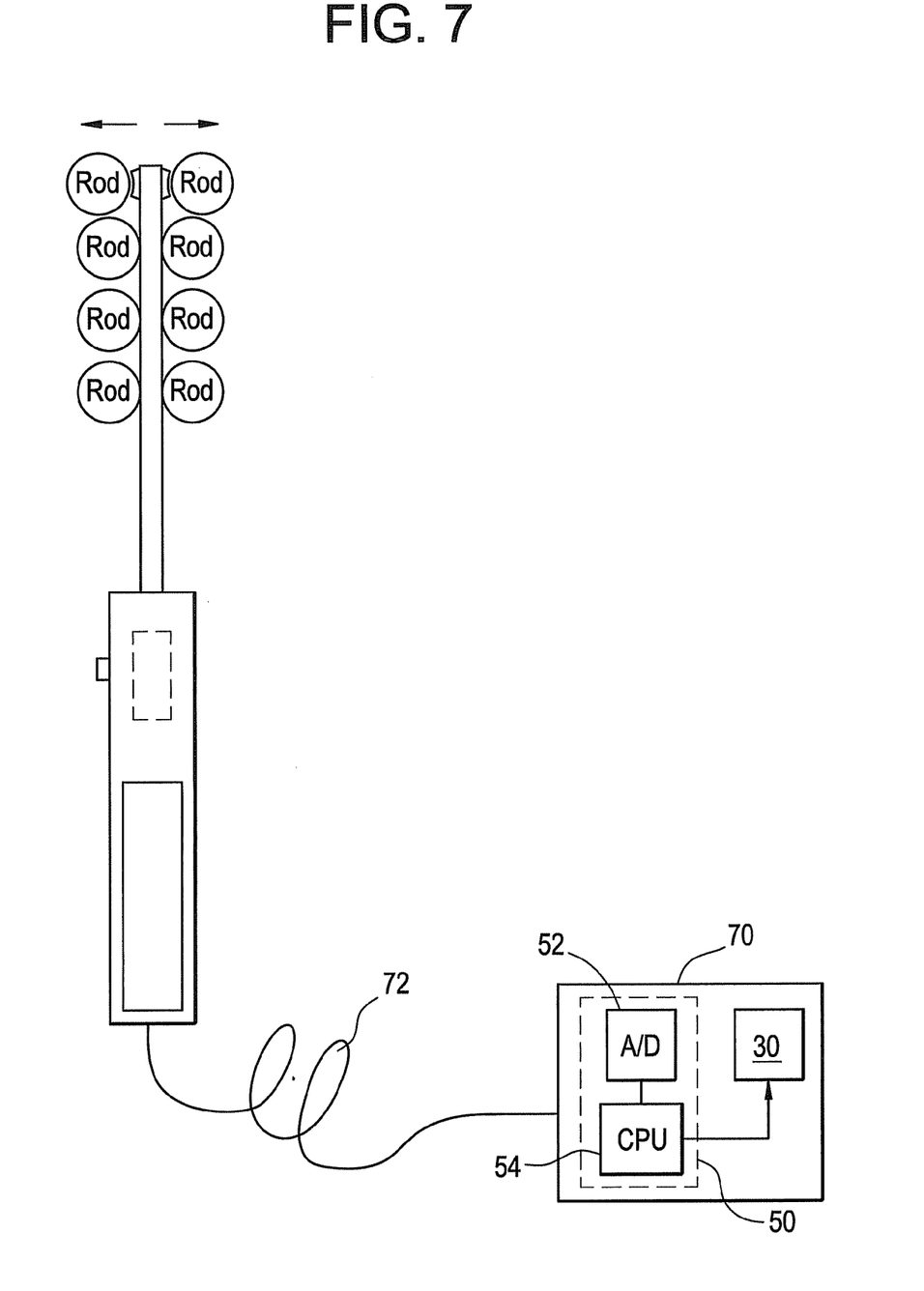
FIG. 7 illustrates a further embodiment of an in-bundle force measurement device according to the present invention.

FIG. 7 illustrates a further embodiment of an in-bundle force measurement device according to the present invention. This embodiment is the same as the embodiment of FIG. 4 except that the processing device 50 and display 30 have been separated from the handle portion 22, and exist as a separate user interface unit 70. The user interface unit 70 may be electrically connected to the first and second sensors 26 and 28 via a cord 72. The cord 72 may be removeably attachable via a conventional plug mechanism to the handle portion 22. For example, the cord 72 may include a male connection member, and the handle portion 22 may include a female connection member. The female connection member may be electrically connected to the first and second sensors 26 and 28 via wires in the main body 20.

As an alternative, the handle portion 22 may also include a wireless transmitter for wirelessly communicating the sensor output to the user interface unit 70.

In the embodiment of FIG. 7, the user interface unit 70 may include a power source (e.g., batteries, solar and/or and AC power connection) and/or the handle portion 22 may include a power source.

Figure 8:
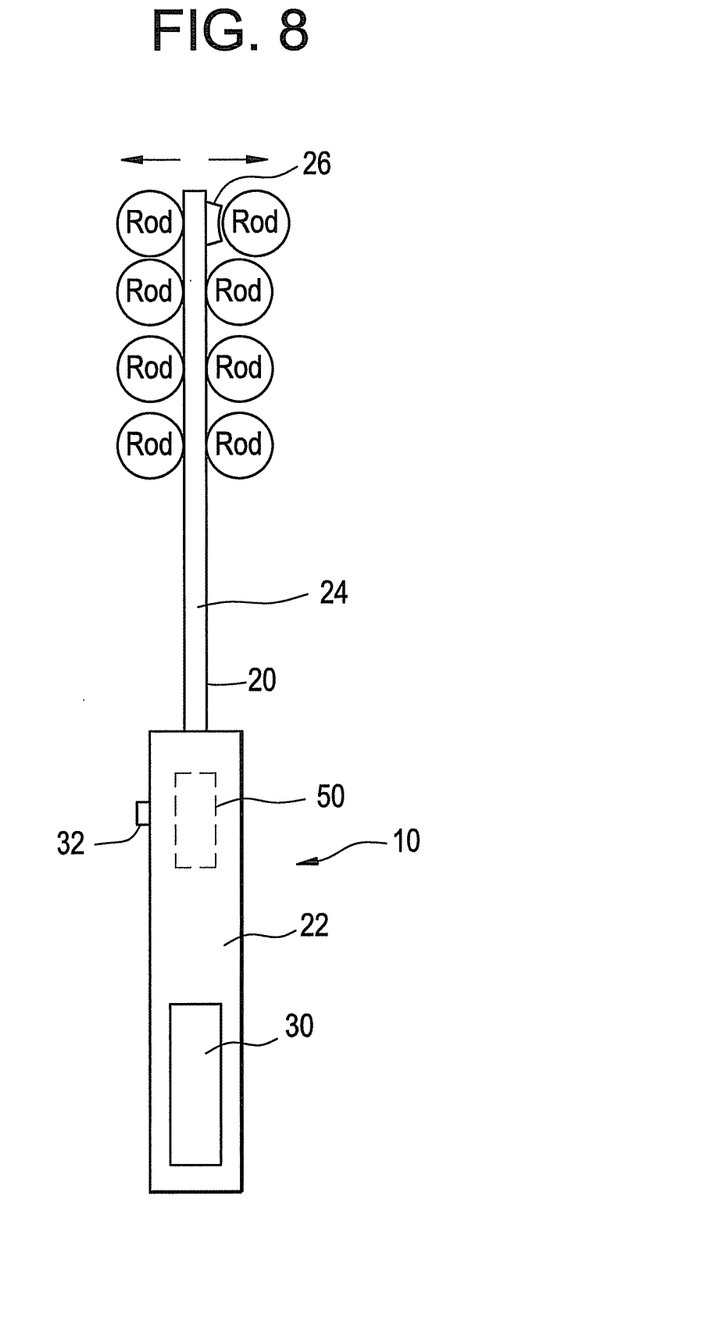
FIG. 8 illustrates a still further embodiment of an in-bundle force measurement device according to the present invention.

FIG. 8 illustrates a still further embodiment of an in-bundle force measurement device according to the present invention. This embodiment is the same as the embodiment of FIG. 4 except that the sensing structure at the distal end of the shaft port 24 includes a single sensor 26. The single sensor 26 is the same as the first sensor 26 in FIG. 4. In this embodiment, the processing device 50 generates a force measurement from the pressuring measurement obtain by the single sensor 26.

Figure 9:
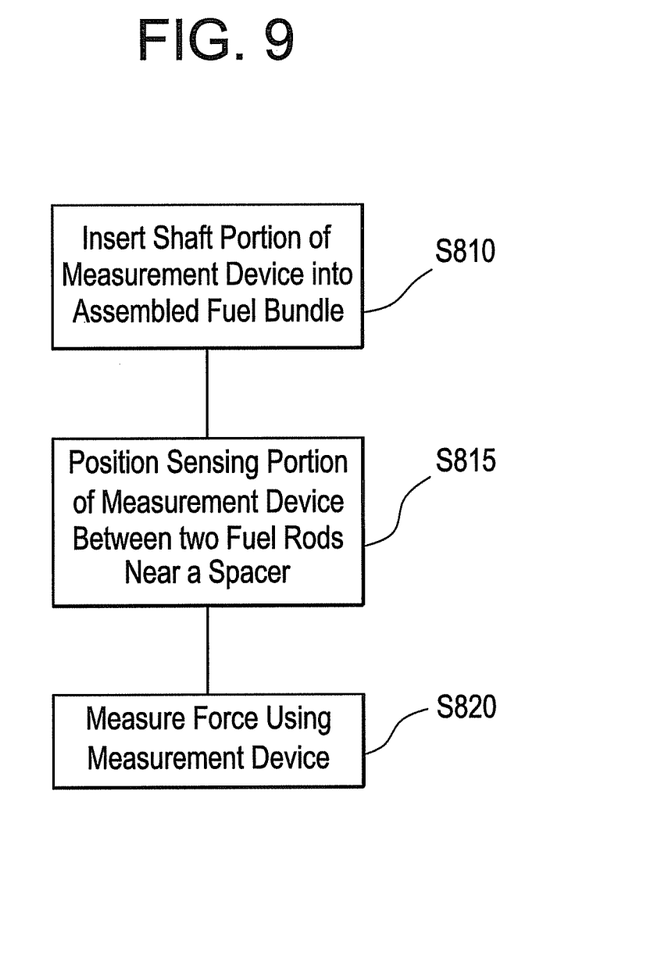
FIG. 9 illustrates a flow chart of a method of measuring force applied by spacers in an assembled fuel bundle according to embodiment of the present invention.

Next, use of the in-bundle force measurement device will be described with respect to FIG. 9. FIG. 9 illustrates a flow chart of a method of measuring force applied by spacers in an assembled fuel bundle according to embodiment of the present invention. For the purposes of example only, this method will be described using the embodiment of FIG. 4 as the example measurement device. As shown, in step S810, while holding onto the handle portion 22, a user inserts the shaft portion 24 of the measurement device 10 into an assembled fuel bundle such as the fuel bundle shown in FIG. 1. FIG. 4 illustrates an example of the shaft portion 24 inserted into a fuel bundle. Next, the user positions the first and second sensors 26 and 28 between two fuel rods in step S815. This is also shown in FIG. 1. As discussed above, the first and second sensors 26 and 28 may have recessed portions 40 and 42 that aid in properly positioning the sensors. For taking a force measurement that relates to the force being applied by a spacer to the fuel rods, the first and second sensors 26 and 28 should be positioned near a spacer, such as spacer 120 in the fuel bundle. For example, placing the first and second sensors 26 and 28 at a consistent distance from the spacer (e.g., within 10 cm) is desirable so that the force measurements for different fuel rod pairs may be compared to one another, and the force measurements may be compared with measurement for other spacers and/or other fuel bundles.

In step S820, the user depresses the push button 32 to take a force measurement using the measurement device 10. The force measurement will be displayed on the display 30. The measurement may be written down by the user. Alternatively or additionally, the measurement device may be communicatively coupled to a computer system, and the measurements recorded in a data base.

Accordingly, when positioned between two fuel rods, the first and second sensors 26 and 28 provide output that indicates an amount of force to separate the fuel rods. This force may directly relate to the force (e.g., spring force) being applied by a spacer to maintain the fuel rods in their desired position. As such, meaningful in-bundle force measurements are possible.

Example embodiments and methods thus being described, it will be appreciated by one skilled in the art that example embodiments may be varied through routine experimentation and without further inventive activity. Variations are not to be regarded as departure from the spirit and scope of example embodiments, and all such modifications as would be obvious to one skilled in the art are to be included within the scope of the following claims.

What is claimed is:

1. An in-bundle force measurement device, comprising:
an elongated main body; and
a sensing structure disposed at a distal end of the main body, the sensing structure configured to output a measurement indicative of pressure force applied to the sensing structure,
wherein the sensing structure includes first and second pressure sensors disposed on the main body facing away from one another,
wherein the first and second pressure sensors each include a concave recessed portion conformed to the outer periphery of a fuel rod.

2. The device of claim 1, wherein the main body comprises:
a handle;
a shaft extending from the handle; and wherein
the first and second pressure sensors are mounted on a distal end of the shaft.

3. The device of claim 2, further comprising:
a processing device configured to convert output from the first and second pressure sensors to the pressure force measurement.

4. The device of claim 3, further comprising:
a display configured to display the pressure force measurement.

5. The device of claim 4, wherein the processing device and the display are disposed in the handle.

6. The device of claim 1, wherein the first and second pressure sensors each include a piezoelectric crystal.

7. The device of claim 1, wherein the first and second pressure sensors output electrical signals representing pressure.

8. The device of claim 1, further comprising:
a user interface unit communicatively connected to the first and second pressure sensors, and configured to communicate a measurement to a user based on output from the first and second pressure sensors.

9. The device of claim 8, wherein the measurement is the pressure force measurement.

10. A method of measuring force applied by spacers of an assembled fuel bundle, comprising:
inserting a measurement device into a fuel bundle loaded with fuel rods, the measurement device including a pressure sensing structure;
positioning the pressure sensing structure of the measurement device between two vertically hanging fuel rods; and
measuring a horizontal pressure force imparted by the fuel rods based on output from the sensing structure.

11. The method of claim 10, wherein the positioning step positions the sensing structure within a desired measurement distance from a spacer of the fuel bundle.

12. The method of claim 11, wherein
the sensing structure includes first and second pressure sensors disposed on a main body and facing away from one another; and
the positioning step positions the first and second pressure sensors such that respective recessed portions of the first and second pressure sensors engage each engage one of the two fuel rods.

* * * * *